T. F. DOLAN.
BRIDLE BIT.
APPLICATION FILED OCT. 28, 1911.
1,037,878.
Patented Sept. 10, 1912.
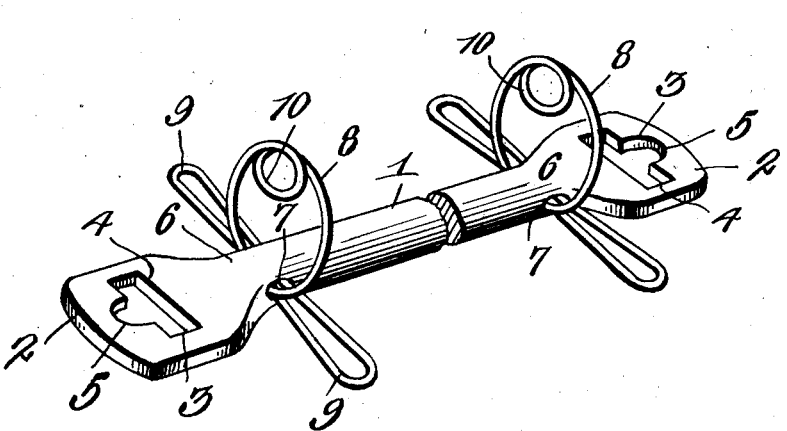
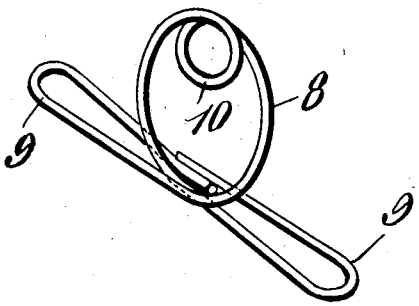
Witnesses
Chas. L. Griestauer.
L. H. Ellis.
Inventor
T. F. Dolan,
By Watson E. Coleman.
Attorney

UNITED STATES PATENT OFFICE.

THOMAS F. DOLAN, OF CANDO, NORTH DAKOTA.

BRIDLE-BIT.

1,037,878.  Specification of Letters Patent.  Patented Sept. 10, 1912.

Application filed October 28, 1911. Serial No. 657,245.

*To all whom it may concern:*

Be it known that I, THOMAS F. DOLAN, a citizen of the United States, residing at Cando, in the county of Towner and State of North Dakota, have invented certain new and useful Improvements in Bridle-Bits, of which the following is a specification, reference being had to the accompanying drawings.

This invention relates to bridle-bits used for the control of horses when riding or driving the animals and has for its object to provide novel details of construction for a bridle bit that enable it to be readily and cheaply manufactured.

The invention consists in the novel construction and combination of parts hereinafter described and claimed.

In the drawings which illustrate by way of example an embodiment of this invention, Figure 1 represents a bridle-bit embodying this invention. Fig. 2 is a detail of a part of this bit.

Similar reference characters refer to similar parts throughout the drawings.

In the construction shown in the drawings, 1 represents a bit-bar, which has its outer end portions 2 enlarged and flattened and provided with holes 3 therein. The inner portions 4 of the holes 3 are preferably rectangular and the outer or stem portions 5 are semicircular in shape as is clearly shown in the drawings. Transverse holes 7 pass through the portions 6 adjacent to each of the parts 2 of the bit-bar.

Suitable wire holders bent into the shape clearly shown in the drawings are disposed within each of the holes 7. These holders consist of looped portions 9, extending on either side of the bit-bar and ring portions 8 that have inner rings 10 formed therein. The ends of the wire holders are arranged to terminate within the transverse holes 7 so that they will be prevented from projecting therefrom in a dangerous manner.

One manner of attaching the head harness to the bit is as follows: The jaw strap is placed within the slots 3 and suitably secured thereto. The cheek straps are secured in the rings 10, and the overdraw-strap to the front looped portions 9. The reins may be secured to the rear portions of the rings 8, or to the rear looped portions 9, or in the semi-circular slots 5. This arrangement provides parts for all the usual harness employed on an animal's head, and is such as not to bring too severe a strain on the mouth of the animal.

The general arrangement and purpose of the other parts of this device are so well known as to not appear to require further description.

Having thus described this invention, what is claimed is:—

A bridle-bit comprising a bit-bar having its outer end portions flattened and provided with slots therein, said slots being arranged to receive guiding reins, said bit-bar having transverse holes through the portions of the same adjacent to said flattened portions, a pair of wire holders disposed in said holes having portions bent so as to form loops arranged to keep the bit-bar in position, said holders having other portions bent to form rings, said rings having inner rings formed in their upper portions arranged to receive bridle-straps, substantially as described.

In testimony whereof I hereunto affix my signature in the presence of two witnesses.

THOMAS F. DOLAN.

Witnesses:
J. S. MOOTHART,
D. F. McLEOD.

Copies of this patent may be obtained for five cents each, by addressing the "Commissioner of Patents, Washington, D. C."